(12) United States Patent
Huotari et al.

(10) Patent No.: US 7,697,956 B2
(45) Date of Patent: Apr. 13, 2010

(54) MANAGEMENT OF LAN DEVICES BEHIND FIREWALLS VIA DUAL MODE MOBILE DEVICE

(75) Inventors: Allen J. Huotari, Garden Grove, CA (US); Kendra S. Harrington, Irvine, CA (US); Matthew B. McRae, Laguna Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 18 days.

(21) Appl. No.: 11/139,175

(22) Filed: May 26, 2005

(65) Prior Publication Data

US 2006/0270448 A1 Nov. 30, 2006

(51) Int. Cl.
*H04M 1/00* (2006.01)
(52) U.S. Cl. ............ 455/552.1; 455/411; 455/414.1; 455/418; 455/432.1; 370/328; 370/338
(58) Field of Classification Search ............ 455/552.1, 455/411, 414.1, 418, 432.1, 441; 370/338, 370/356, 328
See application file for complete search history.

(56) References Cited

U.S. PATENT DOCUMENTS

| | | | |
|---|---|---|---|
| 5,930,727 A * | 7/1999 | Henry, Jr. ............ | 455/557 |
| 6,237,027 B1 * | 5/2001 | Namekawa ............ | 709/206 |
| 7,035,932 B1 * | 4/2006 | Dowling ............ | 709/230 |
| 2002/0045458 A1 * | 4/2002 | Parantainen et al. ...... | 455/466 |
| 2003/0035397 A1 | 2/2003 | Haller et al. | |
| 2003/0139180 A1 | 7/2003 | McIntosh et al. | |
| 2004/0003290 A1 | 1/2004 | Malcolm | |
| 2004/0072593 A1 | 4/2004 | Robbins et al. | |
| 2004/0087307 A1 | 5/2004 | Ibe et al. | |
| 2004/0165551 A1 * | 8/2004 | Krishnamurthi et al. .... | 370/328 |
| 2004/0177375 A1 | 9/2004 | Caspi et al. | |
| 2004/0196808 A1 * | 10/2004 | Chaskar et al. ............ | 370/331 |
| 2005/0059400 A1 | 3/2005 | Jagadeesan et al. | |
| 2005/0064896 A1 * | 3/2005 | Rautiola et al. .......... | 455/553.1 |
| 2005/0159153 A1 * | 7/2005 | Mousseau et al. ........ | 455/432.1 |
| 2005/0232251 A1 * | 10/2005 | Sylvain ...................... | 370/356 |
| 2006/0010200 A1 * | 1/2006 | Mousseau et al. .......... | 709/204 |
| 2006/0031299 A1 * | 2/2006 | Robertson .................. | 709/206 |
| 2006/0039332 A1 * | 2/2006 | Kotzin ........................ | 370/338 |
| 2006/0133329 A1 * | 6/2006 | Lewis et al. ................. | 370/338 |
| 2006/0135150 A1 * | 6/2006 | Oh .............................. | 455/425 |

OTHER PUBLICATIONS

Stark, Barbara, "LAN-Side DSL CPE Configuration," *Technical Report*, DSL Forum TR-064, 30 pages, May 2004.

* cited by examiner

*Primary Examiner*—Nghi H Ly
(74) *Attorney, Agent, or Firm*—Haynes and Boone, LLP

(57) ABSTRACT

Methods and systems are provided for enabling a service provider to manage a service node that is separated from the service provider by a firewall. A dual-mode mobile device establishes separate secure connections with the service provider and the service node. The mobile device can then serve as a bridge between the service provider and the service node so that a secure management session can be initiated between the service provider and the service node. A method of managing a service node includes: establishing a first secure connection between a dual-mode mobile device and the service node; establishing a second secure connection between the dual-mode mobile device and a remote system; and initiating a secure management session between the service node and the remote system via the first secure connection and the second secure connection.

23 Claims, 3 Drawing Sheets

MANAGEMENT OF LAN DEVICES BEHIND FIREWALLS VIA DUAL MODE MOBILE DEVICE

BACKGROUND OF THE INVENTION

The success of cellular telephones and wireless local area networks (WLANs) has facilitated the development of dual-mode mobile devices that make use of both technologies. A dual-mode mobile device, sometimes referred to as a dual-mode mobile station, allows a user to take advantage of residential gateways and access points to check e-mail, surf the Internet, access enterprise networks, and place telephone calls. Thus, WLANs permit dual-mode mobile device users to bypass the traditional cellular network by using the Internet to route telephone calls instead. These dual-mode mobile devices are configured to operate over the WLAN when the phone is within the service area of the wireless access point, and to operate over the cellular network when out of range, such as when the mobile device has been carried out of the building housing the WLAN.

In many typical implementations, the wired broadband access utilized by the WLAN is provided by a broadband service provider, while the wireless cellular access is provided by a wireless service provider unrelated to the broadband service provider. Various service nodes may be located behind a firewall of the local-area network (LAN) for the WLAN location. For security purposes, this firewall may be configured to reject unsolicited connections initiated over a wide-area network (WAN) to the service node within the LAN.

In some situations, the wireless service provider located outside the LAN may wish to access the service node behind the firewall. This may be desired in order to configure the service node for improved communication with the dual-mode mobile device, for example. However, the firewall may prevent the wireless service provider from connecting to the service node to initiate the desired management session.

Accordingly, it would be desirable to provide a system for enabling management of the service node without compromising the security provided by the LAN firewall.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

In accordance with embodiments of the present invention, methods and systems are provided for enabling a service provider to manage a service node that is separated from the service provider by a firewall. A dual-mode mobile device establishes separate secure connections with the service provider and the service node. The mobile device can then serve as a bridge between the service provider and the service node so that a secure management session can be initiated between the service provider and the service node.

Figure 1:
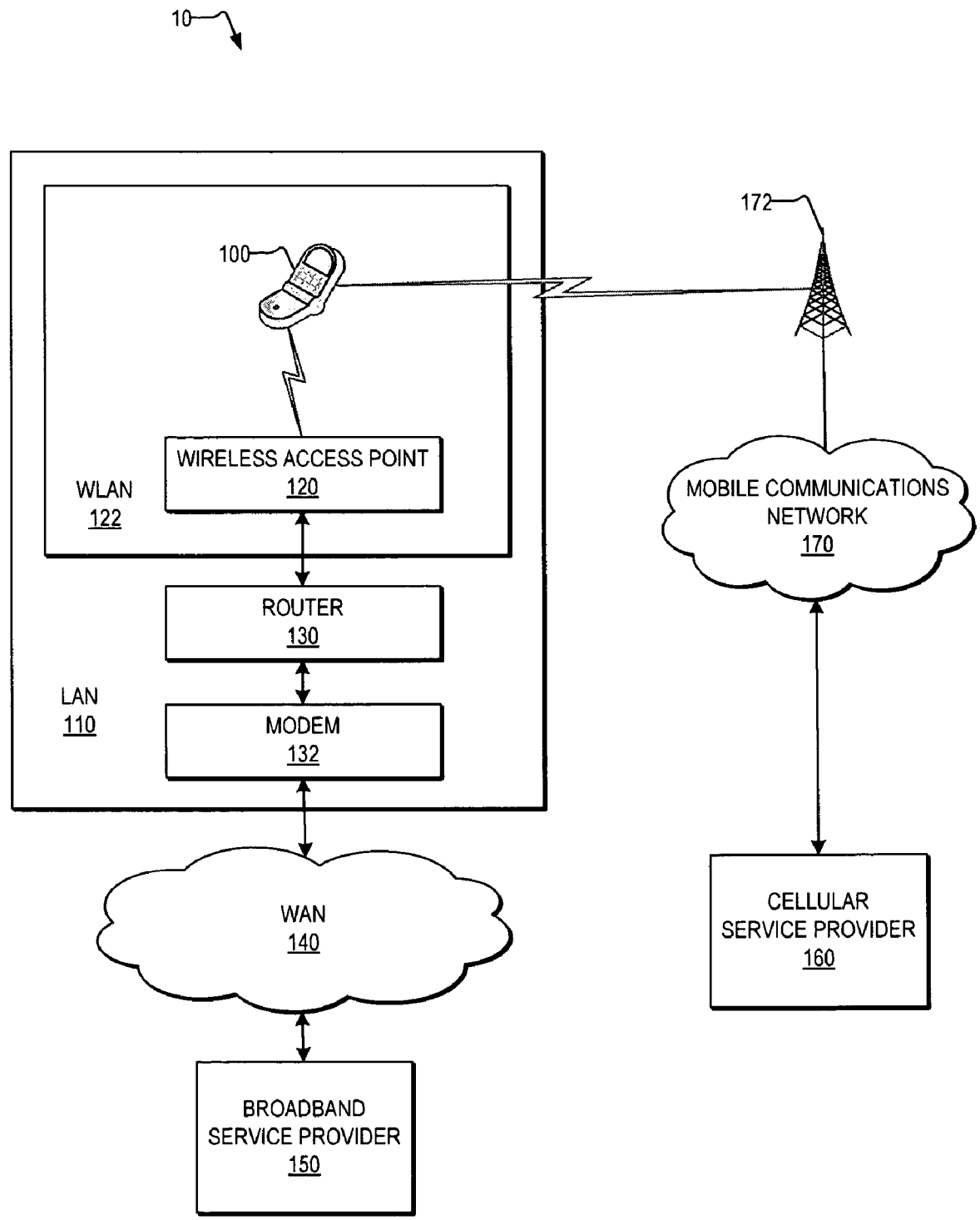
FIG. 1 is a block diagram showing a data communications network for operating a dual-mode mobile device, in accordance with embodiments of the present invention.

FIG. 1 is a block diagram showing an exemplary data communications network 10 for operating a dual-mode mobile device 100, in accordance with embodiments of the present invention. In the illustrated embodiment, the data communications network 10 comprises a local area network (LAN) 110, a wide-area network (WAN) 140, such as, e.g., the Internet, and a mobile communications network 170. The mobile communications network 170 includes a plurality of transceiver base stations 172 which may utilize any of a variety of mobile communications network protocols, such as, e.g., a Global System for Mobile Communications (GSM) system that incorporates General Packet Radio Service (GPRS). In other embodiments, a Code Division Multiple Access (CDMA) or Time Division Multiple Access (TDMA) protocol may be used.

The LAN 110 includes a router (or switch) 130 coupled to a modem 132 that provides an interface to the WAN 140. The router 130 and the modem 132 may be implemented as separate devices or as a single unit, such as a gateway network device. A firewall may be provided in the router to prevent unauthorized access to the LAN 110.

A wireless access point (WAP) 120 provides wireless network connectivity to the LAN 110 via a wireless local-area network (WLAN) 122. The WAP 120 may comprise any device that allows wireless-enabled computers and other devices to communicate with a wired network. The WLAN 122 may comprise a wireless network compliant with the standards governed by, e.g., IEEE 802.11 ("WiFi"), IEEE 802.15.1 ("Bluetooth"), ultra wideband (UWB) radio, etc. The WAP 120 may also be implemented as a separate device or combined with the router 130.

A dual-mode mobile device 100 such as, e.g., a dual mode cellular phone, is configured to establish wireless network connectivity to two different types of wireless networks. In the illustrated embodiment, the dual-mode mobile device 100 is capable of establishing a first network connection to the WLAN 122 via the WAP 120, and a second network connection to a mobile communications network 170 via the base station 172. When the mobile device 100 is within the coverage area of the WLAN 122, the mobile device 100 communicates encoded Internet Protocol (IP) packets (either voice bearing or data bearing) to and from the WAP 120. When the mobile device 100 is beyond the coverage area of the WLAN 122, the mobile device 100 utilizes the mobile communications network 170 for communication.

A dual-mode cellular phone enables a user to utilize VoIP, which allows users to bypass standard phone lines by using the Internet for placing and receiving telephone calls. In addition, a user may utilize a dual-mode cellular phone to transmit and receive data via the WLAN, without utilizing the cellular network. This can potentially reduce communication costs for users and cellular service providers by reducing the amount of cellular bandwidth utilized by the cellular phone for voice and data.

The mobile communications services for the mobile device 100 may be provided by a cellular service provider 160, while the broadband access to the WAN 140 for the LAN 110 may be provided by a broadband service provider 150. In many cases, the cellular service provider and the broadband service provider are two separate entities, with the cellular service provider controlling the equipment related to the mobile communications network 170 and the broadband service provider controlling the equipment related to the LAN 110. The mobile device 100 may be equipment for both the broadband service provider and the cellular service provider.

As described above, a firewall may be provided (e.g., by the router 130) to prevent unauthorized access to the LAN 110. The firewall can be implemented in either hardware or software, or a combination of both. Typically, all messages entering or leaving the LAN 110 pass through the firewall, which examines each message and blocks those that do not meet the specified security criteria. The firewall, WAP 120, router 130, and modem 132 are typically managed by either the broadband service provider 150 over the WAN 140 or are manually managed by a user at a network device located within the LAN 110. When the firewall is enabled, a cellular service provider 160 located outside of the LAN 110 would be prevented from initiating management sessions with any service nodes located behind the firewall within the LAN 110.

Figure 2:
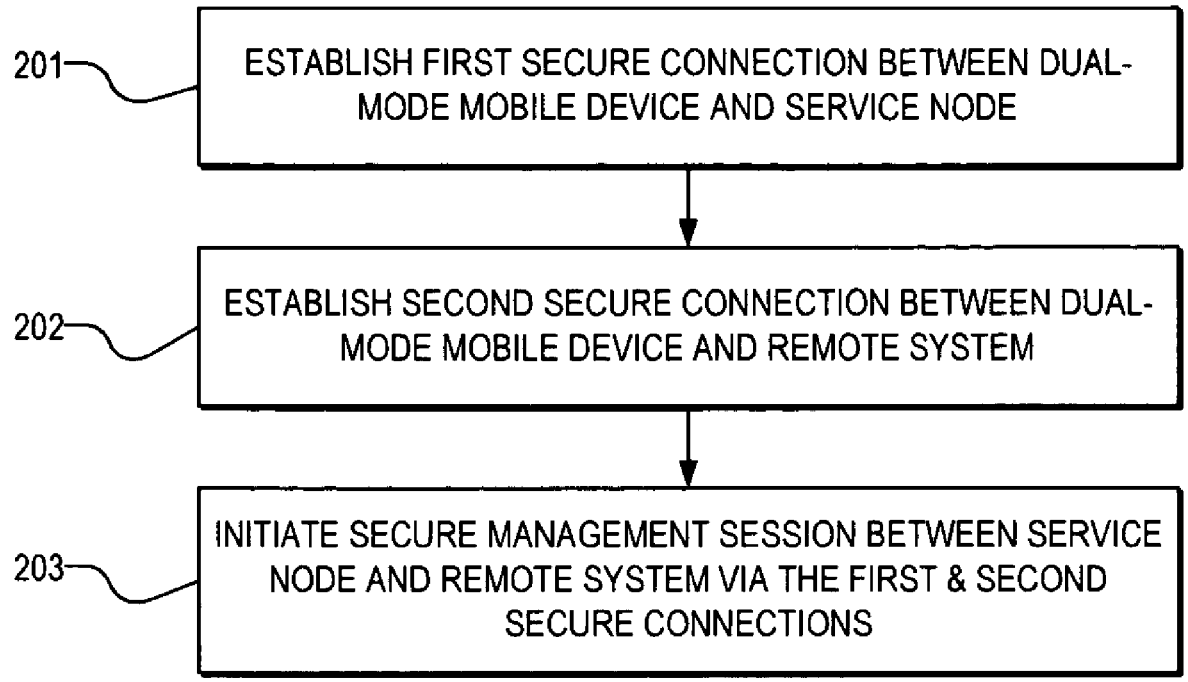
FIG. 2 is a flowchart illustrating a method of managing a service node, in accordance with embodiments of the present invention.

FIG. 2 is a flowchart illustrating a method of managing a service node, in accordance with embodiments of the present invention. In step 201, a first secure connection is established between the dual-mode mobile device 100 and a service node within the LAN 110. The service node may comprise, for example, the WAP 120. In other embodiments, the service node may comprise any device located within the LAN 110.

The WAP 120 includes a transceiver for radio communication with wireless devices located within the service area for the WAP 120. Various methods of establishing a secure connection may be implemented for ensuring secure communications between the WAP 120 and the wireless devices in the WAP service area. For example, Wired Equivalent Privacy (WEP) based security may be implemented by providing the dual-mode mobile device 100 with a secret code or key. Only those devices provided with the correct code will be authorized by the WAP 120 to access the WLAN 122. All communications between the authorized device and the WAP 120 are encrypted using an encryption algorithm. In other embodiments, alternative types of secure connections may be established using improved security algorithms, such as those provided by the Wi-Fi Protected Access (WPA) standard. Secure connections implemented using WPA utilize dynamic keys which are authenticated by the WAP 120 each time the mobile device 100 attempts to connect to the WLAN 122. It will be understood that alternative security algorithms may be used in other embodiments for establishing the secure connection between the mobile device 100 and the WAP 120.

Once the dual-mode mobile device 100 is properly authenticated by the WAP 120, the mobile device 100 will generally be able to access any service node located on the same subnet as the mobile device 100.

In step 202, a second secure connection is established between the dual-mode mobile device 100 and a remote system. This remote system may be, for example, a server managed by the cellular service provider 160. The second secure connection may be established in a variety of ways. In the embodiment shown in FIG. 1, the mobile communications network 170 is utilized for establishing the second secure connection. Various well-known methods for establishing a secure communications connection between a mobile device and a mobile communications network may be used to establish the second secure connection between dual-mode mobile device 100 and the cellular service provider 160. These security procedures may include, for example, air link authentication and encryption, as well as subscriber authentication and service authorization. In some embodiments, the second secure connection may comprise an IP-based network (such as, e.g., GPRS, EDGE, 1xRTT, 1x-EV-Dx, etc.) or may comprise a non-IP-based network.

In step 203, a secure management session between the service node and the remote system is initiated via the first secure connection and the second secure connection. As described above, the mobile device 100 has established the first secure connection to the WLAN 122, thereby enabling the mobile device 100 to securely connect with any service node within the LAN 120. In addition, the mobile device 100 has established the second secure connection to the cellular service provider 160 using the mobile communications network 170. Thus, the dual-mode mobile device 100 can be used to establish an end-to-end secure management connection between the cellular service provider 160 and a service node (e.g., WAP 120) in the LAN 110.

The secure management session may be established in a variety of ways. In one embodiment in which the mobile communications network 170 comprises an IP-based network, the mobile device 100 acquires a public IP address from the mobile communications network 170 upon establishing the second secure connection. In addition, the mobile device 100 also acquires a private IP address for the target service node, which the mobile device 100 maps to its public IP address. The cellular service provider 160 transmits packets of data intended for the service node to the public IP address assigned to the mobile device 100. The mobile device 100 receives these packets of data, translates the destination IP address from the public IP address of the mobile device 100 to the private IP address of the service node, and forwards those packets of data to the target service node. The mobile device 100 effectively operates as a 1:1 Network Address Translation (NAT) device by passing data from the cellular service provider 160 to the service node (e.g., WAP 120).

The secure management session between the service node and the remote system may be used to perform various functions. For example, the cellular service provider 160 may access the WAP 120 to update the WAP firmware, to modify various settings related to the operation of the mobile device 100 on the WLAN 122, to change or verify wireless security settings, to reset the default settings for the WAP 120, etc.

Figure 3:
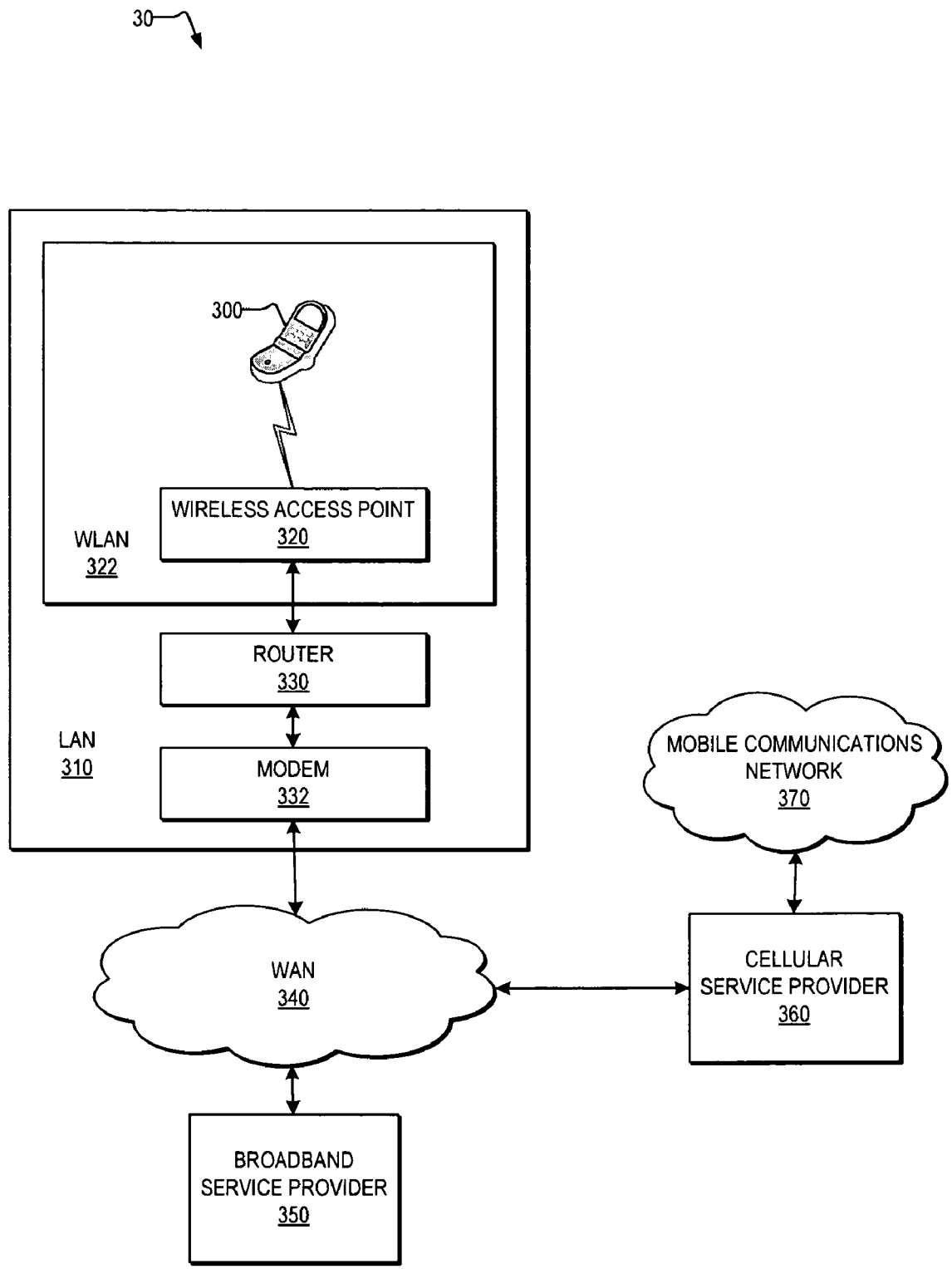
FIG. 3 is a block diagram of a data communications network for operating a dual-mode mobile device, in accordance with another embodiment of the present invention.

FIG. 3 is a block diagram of a data communications network 30 for operating a dual-mode mobile device 300, in accordance with another embodiment of the present invention. Similar to the data communications network 10, the data communications network 30 comprises a LAN 310, a WAN 340, and a mobile communications network 370. The LAN 310 includes a router 330 coupled to a modem 332 that provides an interface to the WAN 340. A WAP 320 provides wireless network connectivity to the LAN 310 via a WLAN 322. A dual-mode mobile device 300 is configured to establish wireless network connectivity to both the WLAN 322 and the mobile communications network 370. A firewall may be provided (e.g., in the router 330) to prevent authorized access to the LAN 310.

A first secure connection is established between the dual-mode mobile device 300 and a service node within the LAN 310, and a second secure connection is established between the dual-mode mobile device 300 and a remote system (e.g., cellular service provider 360). The first secure connection may be formed in the same fashion as described above with respect to FIG. 1. In contrast with the embodiment in FIG. 1, however, the second secure connection is established via WAN 340, as will be described in further detail below.

In FIG. 3, the mobile device 300 establishes the second secure connection to the mobile communications network 370 via the WAN 340. This can be accomplished, for example, by tunneling through the firewall for LAN 310. Tunneling enables one network to send data via another network's connections by encapsulating a network protocol within packets carried by the second network.

In most cases, the LAN firewall will prevent the cellular service provider 360 from initiating the tunnel to the mobile device 300 through the LAN 310. Thus, the tunnel to the cellular service provider 360 may be initiated by the mobile device 300 instead. Once this tunnel is established, the cellular service provider 360 can then initiate a secure management session with the service node as described above with respect to FIG. 1.

The tunnel can be initiated by the mobile device 300 in a variety of ways. For example, a user may manually enter a command into the mobile device 300 to cause the mobile device 300 to establish the tunnel with the cellular service provider 360. Alternatively, the mobile device 300 may be configured to automatically initiate a tunnel during a call. In yet another embodiment, the firewall may be manually configured (e.g., by enabling port forwarding) to allow a connection to traverse the firewall.

In accordance with some embodiments of the present invention, the capability to relay data communications from the remote system to the service node is limited to a single "master" mobile device. In other words, not all mobile devices capable of connecting to the WLAN would be provided the ability to proxy management sessions between the remote system and the service node. This can help to improve the security of the communications system by providing only a single path for circumventing the LAN firewall. In some embodiments, this "master" capability would bind the relay capability of the mobile device to a particular LAN so that one "master" mobile device for a first LAN cannot be used to relay communications for a second LAN. This may be accomplished by an authentication process between the mobile device and the cellular service provider.

Embodiments of the present invention may provide various advantages not provided by prior art systems. In various embodiments, a dual-mode mobile device configured to communicate using a licensed spectrum communications network, such as GSM or GPRS, and an unlicensed spectrum network, such as IEEE 802.11, is utilized to enable a remote system to access and manage a service node separated from the remote system by a firewall. Because the first connection between the mobile device and the service node is secure, and the second connection between the mobile device and the remote system is also secure, end-to-end security for the management session of the service node is provided.

While the invention has been described in terms of particular embodiments and illustrative figures, those of ordinary skill in the art will recognize that the invention is not limited to the embodiments or figures described. For example, in many of the embodiments described above, the remote system is managed by the cellular service provider. In other embodiments, the remote system may be managed by a separate entity unrelated to the service provider managing the mobile communications network. The broadband service provider may also utilize the mobile device to manage the WAP. Alternatively, the target device need not be the wireless access point. For example, other service providers may wish to manage other LAN devices, such as set top boxes, media devices, and the like.

In addition, in examples described above, the data communication between the remote system and the mobile device is IP-based. In other embodiments, other types of data communications protocols may be used. Furthermore, the block diagrams shown in FIGS. 1 and 3 are merely exemplary. It will be understood that in other embodiments, other devices and configurations of devices may be also be provided as part of the data communications networks.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of managing a service node, comprising:
   establishing a first secure connection between a dual-mode mobile device and the service node;
   establishing a second secure connection between the dual-mode mobile device and a remote system, wherein the service node is separated from the remote system by a firewall and wherein the dual-mode mobile device serves as a bridge between the service node and the remote system; and
   initiating a secure management session between the service node and the remote system for managing the service node via the first secure connection and the second secure connection wherein the remote system is enabled to access and manage the service node via the dual-mode mobile device and through the firewall without compromising security of the firewall, and wherein end-to-end security is provided for the secure management session of the service node.

2. The method of claim 1, wherein:
   said service node comprises a wireless access point; and
   said establishing the first secure connection between the dual-mode mobile device and the service node comprises establishing the first secure connection between the dual-mode mobile device and the wireless access point via a wireless local area network.

3. The method of claim 2, further comprising:
   utilizing the secure management session to modify one or more settings of the wireless access point.

4. The method of claim 1, wherein:
   said establishing the second secure connection between the dual-mode mobile device and the remote system comprises establishing the second secure connection between the dual-mode mobile device and the remote system via a mobile communications network.

5. The method of claim 1, wherein:
said initiating the secure management session comprises utilizing the dual-mode mobile device to translate Internet Protocol (IP) domains from a mobile communications network to a private IP domain of the service node.

6. The method of claim 1, wherein:
said service node is coupled to a wide-area network (WAN) via a firewall.

7. The method of claim 6, wherein:
said establishing the second secure connection comprises establishing the second secure connection between the dual-mode mobile device and the remote system via a tunnel through the firewall.

8. The method of claim 1, wherein:
said establishing the second secure connection between the dual-mode mobile device and the remote system comprises receiving an input at the dual-mode phone to initiate the second secure connection.

9. The method of claim 8, wherein:
said establishing the second secure connection between the dual-mode mobile device and the remote system comprises establishing the second secure connection for a predetermined duration.

10. The method of claim 1, further comprising:
utilizing the secure management session to modify one or more settings of the service node.

11. The method of claim 10, wherein:
said utilizing the secure management session to modify one or more settings of the service node comprises utilizing the secure management session to modify one or more settings related to operation of the mobile device.

12. A dual-mode mobile device, comprising:
a first interface for establishing a first secure connection between the dual-mode mobile device and a service node in a local area network (LAN) with the dual-mode mobile device;
a second interface for establishing a second secure connection between the dual-mode mobile device and a remote system, wherein the service node is separated from the remote system by a LAN firewall and wherein the dual-mode mobile device serves as a bridge between the service node and the remote system; and
control logic configured to initiate a secure management session between the service node and the remote system for managing the service node via the first secure connection and the second secure connection wherein the remote system is enabled to access and manage the service node via the dual-mode mobile device and through the LAN firewall without compromising security of the LAN firewall, and wherein end-to-end security is provided for the secure management session of the service node.

13. The device of claim 12, wherein:
said service node comprises a wireless access point; and
said second interface is configured to establish the first secure connection between the dual-mode mobile device and the wireless access point via a wireless local area network.

14. The device of claim 13, wherein:
said control logic is configured to initiate the secure management session between the service node and the remote system to modify one or more settings of the wireless access point.

15. The device of claim 12, wherein:
said second interface is configured to establish the second secure connection between the dual-mode mobile device and the remote system via a mobile communications network.

16. The device of claim 12, wherein:
said control logic is configured to translate Internet Protocol (IP) domains from a mobile communications network to a private IP domain of the service node.

17. The device of claim 12, wherein:
said service node is coupled to a wide-area network (WAN) via a firewall.

18. The device of claim 17, wherein:
said second interface is configured to establish the second secure connection between the dual-mode mobile device and the remote system via a tunnel through the firewall.

19. The device of claim 12, further comprising:
a user interface;
wherein said control logic is configured to initiate the second secure connection in response receiving an input at the user interface.

20. The device of claim 19, wherein:
said control logic is configured to establish the second secure connection for a predetermined duration.

21. The device of claim 12, wherein:
said control logic is configured to initiate the secure management session between the service node and the remote system to modify one or more settings of the service node.

22. The device of claim 21, wherein:
said control logic is configured to initiate the secure management session between the service node and the remote system to modify one or more settings related to operation of the mobile device.

23. A dual-mode mobile device, comprising:
a means for establishing a first secure connection between the dual-mode mobile device and a service node;
a means for establishing a second secure connection between the dual-mode mobile device and a remote system, wherein the service node is separated from the remote system by a firewall and wherein the dual-mode mobile device serves as a bridge between the service node and the remote system; and
a means for establishing a secure management session between the remote system and the service node for managing the service node by transmitting data communications received from the remote system to the service node wherein the remote system is enabled to access and manage the service node via the dual-mode mobile device and through the firewall without compromising security of the firewall, and wherein end-to-end security is provided for the secure management session of the service node.

* * * * *